United States Patent [19]
Kostin

[11] Patent Number: 4,890,888
[45] Date of Patent: Jan. 2, 1990

[54] SEAT BACK ATTACHMENT
[75] Inventor: Richard M. Kostin, Dearborn, Mich.
[73] Assignee: Ford Motor Company, Dearborn, Mich.
[21] Appl. No.: 243,000
[22] Filed: Sep. 12, 1988
[51] Int. Cl.$^4$ .............................................. A47C 7/00
[52] U.S. Cl. ..................................... 297/443; 297/452
[58] Field of Search ..................... 297/444, 443, 452; 248/159, 188.5

[56]            References Cited
U.S. PATENT DOCUMENTS

| | | | |
|---|---|---|---|
| 1,928,179 | 9/1933 | Kahle | 248/188.5 |
| 1,928,857 | 10/1933 | Kelly | 297/444 X |
| 2,124,842 | 7/1938 | Zierold et al. | 248/188.5 |
| 2,456,794 | 12/1948 | Richardson | 297/443 |
| 2,650,656 | 9/1953 | Ohlsson | 297/443 X |
| 2,668,584 | 2/1954 | Greitzer | 297/444 |
| 3,102,638 | 9/1963 | Saunders | 248/159 |
| 3,989,298 | 11/1976 | Cycowicz et al. | 297/443 |
| 4,740,035 | 4/1988 | Kazaoka et al. | 297/452 |

Primary Examiner—Francis K. Zugel
Attorney, Agent, or Firm—Daniel M. Stock; Clifford L. Sadler

[57]              ABSTRACT

An automobile seat assembly is provided with an attachment mechanism for fixing the seat back to the seat base that effects wedging engagement between support arms of the seat base and support brackets of the seat back by forming the arms and brackets as complementary tapered channels. A secondary locking device in the form of a spring detent disposed between the arms and brackets operates to resist removal from the wedgingly engaged assembled position.

10 Claims, 3 Drawing Sheets

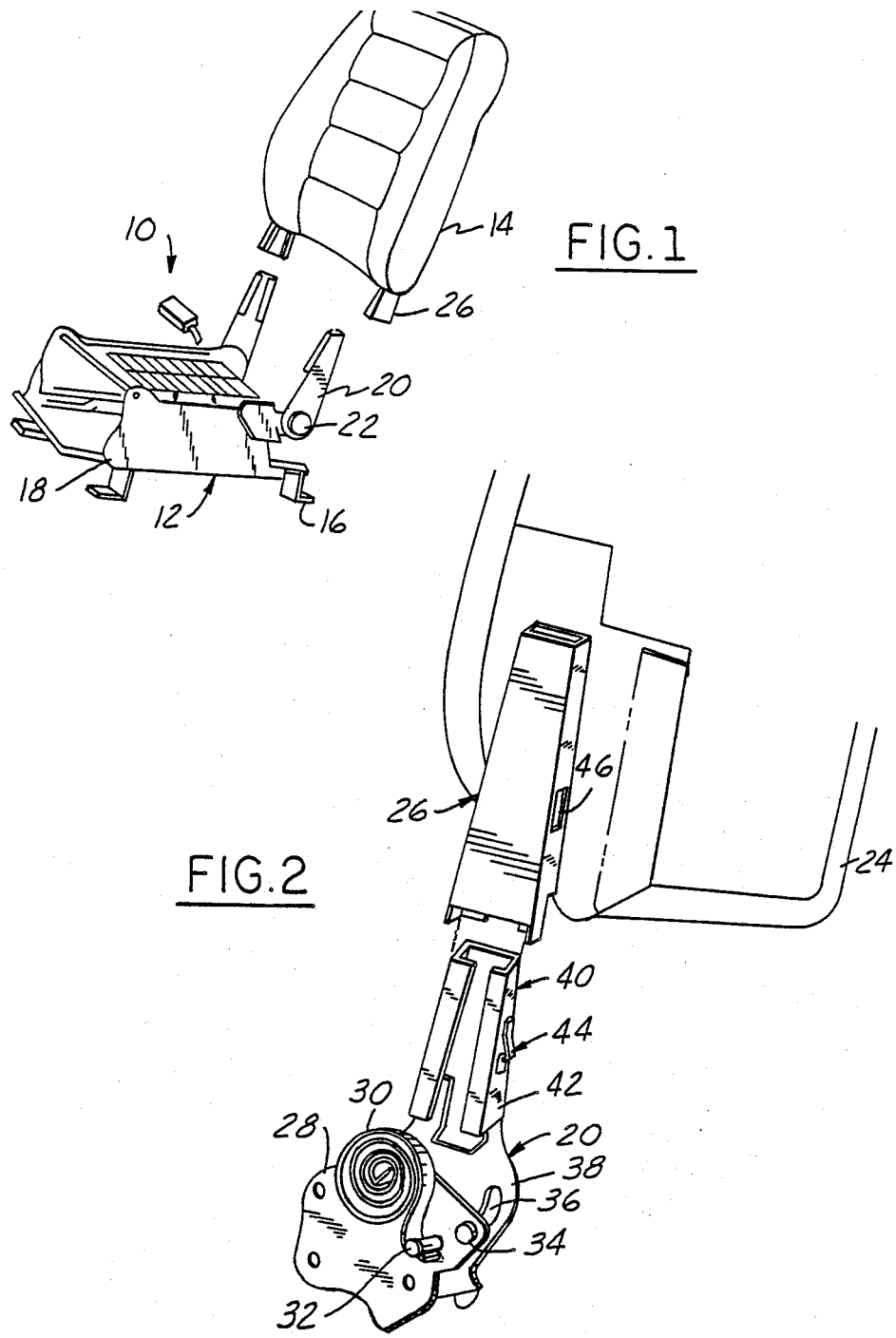

SEAT BACK ATTACHMENT

BACKGROUND OF THE INVENTION

The present invention relates generally to automotive seating and more particularly to mechanisms for attaching seat backs to seat bases.

DESCRIPTION OF THE PRIOR ART

It is the predominant present practice in the automotive industry to fix seat backs to seat bases by applying mechanical fasteners to interconnect stiff metallic arms and brackets carried on the seat base and seat back. A plurality of fasteners and various mechanical stop mechanisms may be interposed between the seat back and seat base parts to prevent vertical or rotational separation of the two main parts of the seat. The arms and brackets of the seat base and seat back are generally plates of the type shown in U.S. Pat. No. 4,313,638 to Roper. In such seat designs, assembly of the seat back to the seat base tends to be a somewhat labor intensive operation owing to the requirement to align and secure the fasteners interposed between the parts of the back and base. An improved design for an attachment to be economically and efficiently accomplished without the use of separate fasteners is therefore considered to be desirable.

Directly engagable and cooperative components in seating environments other than the attachment of automotive seat back to seat base have been shown in the art but there has been no suggestion of an attachment configuration that would yield the desired results of economical and efficient assembly permitting ready disassembly without the use of separate joining fasteners. U.S. Pat. No. 1,525,074 to Heintz, for example, shows the positioning of a seat arm in a portion of the base of the seat with seat back and base joined by a threaded fasteners. Also, U.S. Pat. No. 4,045,834 to Mason shows a telescoping arrangement of snap-fit tubing to form seat base and seat back support structure. The light resistance to telescoping movment afforded by such constructions is not suitable for the connection of automotive seat backs to seat bases.

A more recent advance in the state of the automotive seat construction art is that shown and labelled "prior art" in FIG. 8 of this application and described in the following specification. This prior art attachment involves the provision of a spring-loaded cam mechanism to urge a portion of the seat back against a portion of the seat base. While relatively easy to assemble, this design has been found to be disadvantageous in that it is tolerance sensitive of the configuration of the adjacent seat back and seat base parts to ensure locking abutment along sufficient surface length or area to assure assembled stability.

SUMMARY OF THE INVENTION

Responsive to deficiencies in the prior art, it is an object of the present invention to provide an automobile seat having an attachment mechanism for fixing the seat back to the seat base in a stable and positive manner without the use of separate externally inserted fasteners.

This object is accomplished through the provision of support arms carried on the seat base and support brackets carried on the seat back formed as complementarily tapered channel members that are wedgingly and lockingly engaged upon assembly of the seat back brackets over the seat base arms. The locking engagement between seat back and seat base is made further secure by the provision of a secondary locking mechanism interposed between at least one of the mating sets of brackets and arms consisting of a form of resilient detent carried by the seat base support arm and deflectable during assembly to a position permitting movement of the seat back support bracket over the arm into wedging engagement whereupon the detent flexes outwardly through an aperture formed in the bracket to restrain the seat back against movement away from the wedgingly engaged position to prevent inadvertent removal of the seat back.

BRIEF DESCRIPTION OF THE DRAWINGS

Other objects and features will become apparent to those skilled in the automotive seating arts upon reading the following description with reference to the drawings in which:

FIG. 1 a perspective view of an automotive seat according to the present invention;

FIG. 2 is an enlarged perspective view of the seat of FIG. 1 illustrating the attachment mechanism of the present invention;

DESCRIPTION OF THE PREFERRED EMBODIMENT

Figure 3:
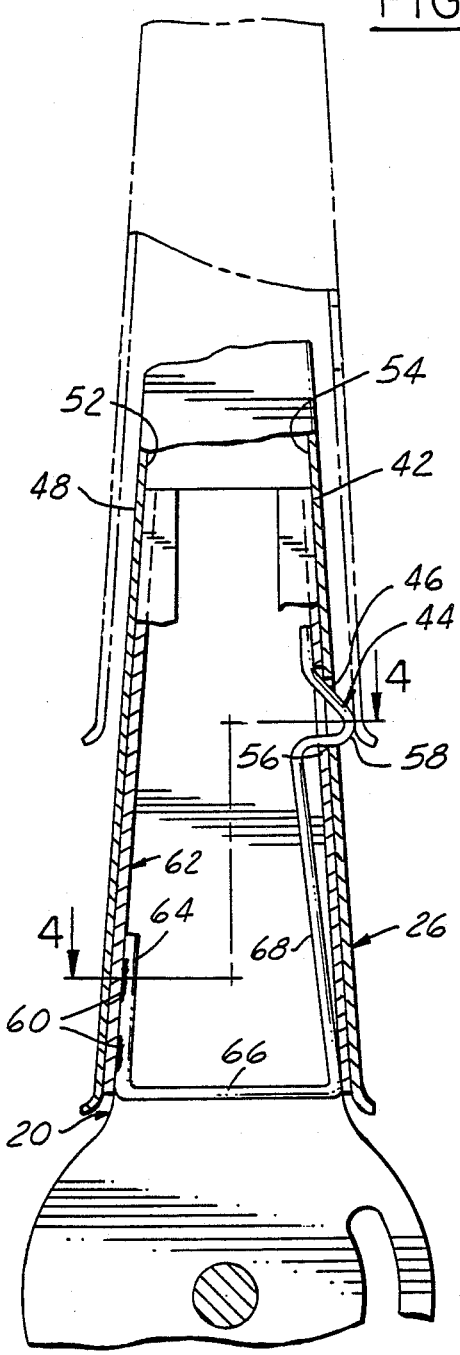
FIG. 3 is a cross-sectional view of an attachment mechanism of the present invention illustrating its assembly and the construction of one form of the spring detent.

Turning now to the drawings and particularly to FIG. 1 thereof, an automotive seat assembly 10 is illustrated as including a base portion 12 and a seat back portion 14. The base portion 12 includes feet 16 adapted to be secured to a portion of the vehicle body (not shown) and a cushion frame 18 for supporting a well-known seat cushion (not shown). The seat assembly 10 here illustrated is of the type permitting tilting movement of the seat back 14 with respect thereto. The attachment mechanism of the present invention, however, may be used in seat assembly not incorporating such tilting movement features. The seat assembly 10 includes a pair of support arms 20 pivotally mounted as indicated at 22 on opposed lateral edges of the rear of the seat cushion frame 18.

The seat back portion 14 is illustrated as including a cushion portion 24 enclosing a frame portion (not shown). A pair of laterally spaced support brackets 26 are fixed to the frame portion and depend downwardly from the cushion portion 24.

Figure 4:
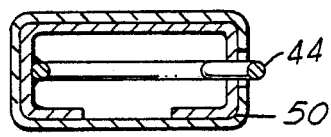
FIG. 4 is a cross-sectional view taken along lines 4—4 of FIG. 3.

Turning next to FIG. 2, the cooperation of the seat base support arms 20 and the seat back brackets 26 to effect attachment between the base portion 12 and the back portion 14 can best be appreciated. The support arm 20 is illustrated as being mounted on a plate 28, on which is mounted a clock spring 30 grounded at its inner end to the pivotal connection 22 and at its outer end to a fixed pin 32 for biasing the support arm 20 toward a substantially vertical position as limited by the cooperation of a pin 34 inserted through the plate 28 into a slot 36 formed through a mounting portion 38 of the support arm 20. The upper portion 40 of the support arm, as shown in FIG. 2, tapers inwardly toward its upper free end and is formed as an open channel member. On one of its inwardly tapering side surfaces 42, a spring detent 44 is carried. At least a lower portion of a support bracket 26 of the seat back portion 14 is constructed as a channel member of closed cross-section having portions tapering outwardly along the downward extent of the bracket 26 in complementary fashion with respect to the support arms 20, as may best be seen in FIG. 4. An aperture 46 is formed through the side of the bracket 26 corresponding to the side 42 of support arm 20 for receiving the spring detent 44.

Turning next to FIG. 3, the cooperation of the tapered channel members of the support arms 20 and the support brackets 26 and the spring detent 44 may be considered in more detail. It may be seen that front and rear outer surfaces 48, 42 of the support arm 20 are tapered in complementary fashion with corresponding front and rear inner surfaces 52, 54 of the support brackets 26 so that downward linear movement of the seat back 14 with respect to the seat base 12 to the position shown in the solid line in FIG. 3 effects wedging engagement between the support arms 20 and the support brackets 26. This simple linear inserting motion is particularly desirable in that it is a motion readily accomplished through automatic means such as robotic assembly. As may best be seen in FIG. 4, the wedging encapsulation of the brackets 26 over the arms 20 is enhanced by the tendency of the brackets 26 to flex the open channelled arms 20 inwardly. Generous corner radii 50 are provided to round the corners of the arms 20 and facilitate this flexure.

It further will be noted that in the fully assembled solid line position of FIG. 3 that the aperture 46 formed through support bracket 26 registers with an aperture 56 formed through the support arm 20 receiving a wire hook portion 58 of the spring detent 44. Spring detent 44 is illustrated in the FIG. 3 embodiment as comprising a shaped spring wire secured as by welding indicated at 60 to an inner wall 62 of the support arm 20 along an upstanding leg 64. A bridge portion 66 extends across the support arm 20 and terminates in a canted upwardly extending leg portion 68 approximate the free end of which is formed the hook portion 58. As may be seen in FIG. 3, movement of the seat back portion 14 from the dotted line position at the top of the Figure to the assembled position shown in solid line effects deflection of the hook portion 58 inwardly through the apertures 46, 56 to permit assembly to the wedgingly engaged position shown. When in this position, the apertures 46, 56 are aligned and the hook portion 58 extends outwardly to prevent reverse upward movement of seat back 14 with respect to seat base 12.

Figure 5:
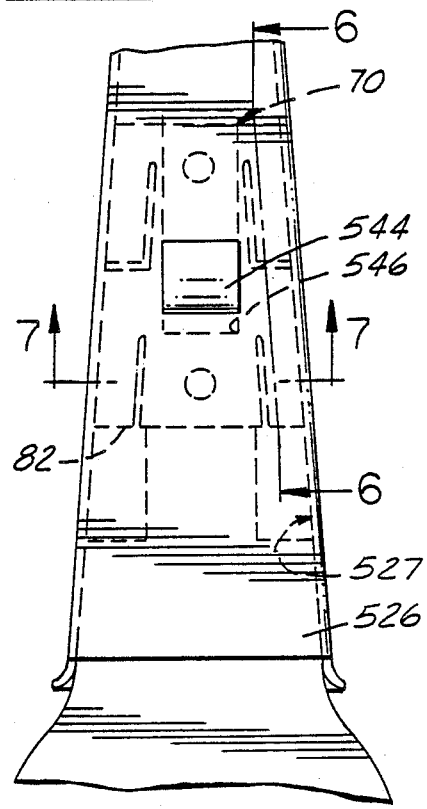
FIG. 5 is a side view of an attachment mechanism according to the present invention in the assembled position showing another embodiment of the attachment mechanism.
Figures 6, 7, 8:
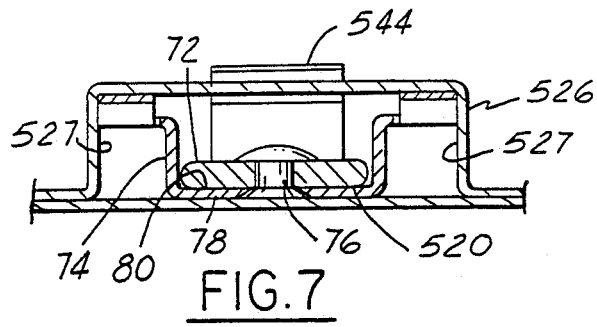
FIG. 6 is, a cross-sectional view taken along lines 6—6 of FIG. 5.
FIG. 7 is a cross-sectional view taken along lines 7—7 of FIG. 5.
FIG. 8 is a cross-sectional view of a portion of a prior art attachment mechanism.

Turning next to FIGS. 5-7, an alternative embodiment of the attachment mechanism and the detent mechanism 44 is indicated generally at 70. The detent mechanism 70 differs from the configuration shown in FIGS. 2, 3 and 4 essentially in that a spring detent 544 is lockingly engaged through an aperture 546 on the side of the seat bracket 526.

The spring detent 544 is fixed to an outer surface 72 of the support arm 520 which is partially surrounded as may best be seen in FIG. 7 by a wedge shaped support carrier 74 through fasteners such as rivets indicated at 76. The support carrier 74, as may best be seen in FIGS. 5, 6 and 7, is preferably formed as a stamping and includes a depressed central section 78 for receiving a portion of the arm 520 and has an outer surface 80 abuttingly engaging a portion of the bracket 526. A plurality of spring fingers 82 adjacent corners of the carrier 74 are aligned with outer surfaces of the carrier 74 and are tapered with respect to the front and rear ends of the arms 520 to wedgingly engage inner surfaces 527 of the bracket 526 and are set off to resiliently urge the arm 520 in one lateral direction with respect to the bracket 526 as depicted as downwardly in FIG. 7. This configuration is particularly advantageous if as is illustrated in FIG. 5 the arm 526 itself is not tapered to wedgingly engage the bracket 520 as in the FIGS. 2 and 3 configuration but is itself straight. The locking wedge advantageous operation of the FIGS. 1-3 embodiments is obtained by fabrication of the carrier 74 in the wedge-like configuration shown in FIGS. 5, 6 and lateral stability of the wedge connection is ensured by provision of the spring fingers 80. Secondary locking is, of course, effected in much the same manner as described with respect to FIGS. 2 and 3 in that assembly of the bracket members 526 over the arm members 520 to a position where the spring detent 544, illustrated here as a leaf spring mounted in cantilever fashion, registers with the aperture 546 first effects deflection of the detent 544 within the confines of the channel of the bracket 526 and subsequently permits the outward flexing of the spring detent 544 to effect locking engagement against vertical removal of the seat back 14 from the seat base 12.

Consideration of the embodiments described will make clear to those skilled in the automotive seating arts that the construction of seat attachment mechanisms according to the present invention provides for the secure assembly of the seat back to a seat base upon mere insertion of the seat back with its depending brackets into encapsulating relationship with respect to the seat base and its upwardly extending arms. The complementarily tapered interface is provided between the various preferred embodiments of the seat attachment of the present invention all provide for wedging contact between arm and bracket and for a secondary spring detent locking mechanism resisting separation between those components.

No multi-surface wedging engagement between the components of the type has been accomplished or suggested by embodiments such as those of FIG. 8 in which a spring loaded cam mechanism 84 affects engagement of a eat base arm 820 laterally against one wall 86 of a seat back bracket 826. The constructional advantages of the described embodiments which provide effective wedging engagement and positive secondary locking will be apparent to those skilled in the seat construction arts.

While only certain embodiments have been described, others may be possible without departure from the scope of the following claims.

I claim:

1. An attachment mechanism for securing a seat back to the seat base of an automotive seat comprising:

a pair of support arms formed as channel members laterally spaced proximate the rear edge of the seat base and extending upwardly therefrom, a pair of laterally spaced support brackets formed as channel members encapsulatingly engagable with the support arms and depending downwardly from the seat back, means defining complementary tapered surfaces on the support arms and the support brackets to permit wedging engagement therebetween, means defining an aperture extending through a wall of one support bracket, and a resilient detent member carried with the corresponding support arm, the detent member being deflectable to permit wedging engagement of the support bracket over the arm and thereupon swinging outwardly through and exteriorly of the bracket aperture to prevent removal of the seat back from the seat base.

2. An attachment mechanism for securing a seat back to the seat base of an automotive seat comprising:

a pair of support arms formed as channel members having an open cross-sectional portion and being laterally spaced proximate the rear edge of the seat base and extending upwardly therefrom;

a pair of laterally spaced support brackets formed as channel members having a closed cross-sectional portion encapsulatingly engagable over the open channel portion of the support arms and depending downwardly from the seat back;

means defining complementary tapered surfaces on the support arms and the support brackets to permit wedging engagement therebetween, producing cross-sectionally inward flexure of the support arm open channel portion; and spring detent means carried between at least one of the support arms and the corresponding bracket operative to permit relative movement of the arm and bracket in one direction to effect wedging engagement therebetween and to prevent movement in the opposite direction thereto.

3. An attachment mechanism as defined in claim 2 wherein the spring detent means comprises means defining an aperture through each of the support arm channel member and the bracket channel member, the apertures being aligned when the channel members are wedgingly engaged, and a shaped wire member fixedly mounted within the support arm channel member and having a hook portion resiliently urged to extend through the aligned apertures exteriorly of the support bracket when the arm and the bracket are moved relatively to effect wedging engagement therebetween.

4. An attachment mechanism for securing a seat back to the seat base of an automotive seat comprising:

a pair of support arms laterally spaced proximate the rear edge of the seat base and extending upwardly therefrom;

a wedge shaped support carrier having tapered front and rear surfaces fixedly secured to each of the support arms;

a pair of laterally spaced support brackets formed as channel members adapted to receive the carrier and depending downwardly from the seat back;

means defining complementary tapered surfaces on the support brackets to permit wedging engagement between the brackets and the carrier; and spring detent means carried between at least one of the support arms and the corresponding bracket operative to permit relative movement of the arm and bracket in one direction to effect wedging engagement therebetween and to prevent movement in the opposite direction thereto.

5. An attachment mechanism as defined in claim 4 and further comprising means for resiliently biasing the arm laterally with respect to the bracket.

6. An attachment mechanism as defined in claim 4 wherein the biasing means comprises a plurality of spring fingers engaged between the carrier and the bracket.

7. An attachment mechanism as defined in claim 6 wherein the spring fingers are integrally formed with the carrier and abuttingly engage inner surfaces of the bracket channel.

8. An automobile seat comprising a seat back, a seat base and an attachment mechanism for securing the seat back to the seat base of an automotive seat, the attachment mechanism comprising:

a pair of support arms formed as channel members laterally spaced proximate the rear edge of the seat base and extending upwardly therefrom;

a pair of laterally spaced support brackets formed as channel members encapsulatingly engagable with the support arms and depending downwardly from the seat back;

means defining complementary tapered surfaces on the support arms and the support brackets to permit wedging engagement therebetween;

means defining an aperture extending through a wall of one support bracket; and a resilient detent member carried with the corresponding support arm, the detent member being deflectable to permit wedging engagement of the support bracket over the arm and thereupon swinging outwardly through and exteriorly of the bracket aperture to prevent removal of the seat back from the seat base.

9. An automobile seat comprising a seat back, a seat base and an attachment mechanism for securing the seat back to the seat base of an automotive seat, the attachment mechanism comprising:

a pair of support arms formed as channel members having an open cross-sectional portion and being laterally spaced proximate the rear edge of the seat base and extending upwardly therefrom;

a pair of laterally spaced support brackets formed as channel members having a closed cross-sectional portion encapsulatingly engagable over the open channel portion of the support arms and depending downwardly from the seat back;

means defining complementary tapered surfaces on the support arms and the support brackets to permit wedging engagement therebetween, producing cross-sectionally inward flexure of the support arm open channel position; and spring detent means carried between at least one of the support arms and the corresponding bracket operative to permit relative movement of the arm and bracket in one direction to effect wedging engagement therebetween and to prevent movement in the opposite direction thereto.

10. An automotive seat comprising a seat back, a seat base and an attachment mechanism for securing the seat back to the seat base of an automotive seat, the attachment mechanism comprising:

a pair of support arms laterally spaced proximate the rear edge of the seat base and extending upwardly therefrom;

a wedge-shaped support carrier having tapered front and rear surfaces fixedly secured to each of the support arms;

a pair of laterally spaced support brackets formed as channel members adapted to receive the carrier and depending downwardly from the seat back;

means defining complementary tapered surfaces on the support brackets to permit wedging engagement between the brackets and the carrier; and spring detent means carried between at least one of the support arms and the corresponding bracket operative to permit relative movement of the arm and bracket in one direction to effect wedging engagement therebetween and to prevent movement in the opposite direction thereto.

* * * * *